United States Patent [19]

Raleigh et al.

[11] Patent Number: 5,612,438
[45] Date of Patent: *Mar. 18, 1997

[54] CURABLE SILOXANE POLYMERS CONTAINING INTEGRAL UV ABSORBERS

[75] Inventors: William J. Raleigh, Rensselaer; Raymond J. Thimineur, Scotia, both of N.Y.; James A. Campagna, Pittsfield, Mass.

[73] Assignee: General Electric Company, Waterford, N.Y.

[ * ] Notice: The term of this patent shall not extend beyond the expiration date of Pat. No. 5,310,845.

[21] Appl. No.: 547,907

[22] Filed: Oct. 25, 1995

Related U.S. Application Data

[63] Continuation of Ser. No. 411,061, Mar. 27, 1995, abandoned, which is a continuation of Ser. No. 208,761, Mar. 8, 1994, abandoned, which is a division of Ser. No. 974,054, Nov. 10, 1992, Pat. No. 5,310,845.

[51] Int. Cl.⁶ ................................................... C08G 77/04
[52] U.S. Cl. ..................... 528/26; 524/266; 524/267; 524/268; 524/731; 528/18; 528/21; 528/22; 528/34; 528/41
[58] Field of Search ........................... 528/18, 21, 22, 528/34, 41, 26; 524/266, 267, 268, 731

[56] References Cited

U.S. PATENT DOCUMENTS

| | | | |
|---|---|---|---|
| 4,278,804 | 7/1981 | Ashby et al. | 556/436 |
| 4,554,369 | 11/1985 | Hill et al. | 556/418 |
| 4,696,969 | 9/1987 | Thimineur et al. | 524/762 |
| 4,975,472 | 12/1990 | Motegi et al. | 522/33 |
| 5,049,377 | 9/1991 | Lamb et al. | 424/70 |
| 5,089,250 | 2/1992 | Forestier et al. | 424/43 |
| 5,310,845 | 5/1994 | Raleigh et al. | 528/18 |

*Primary Examiner*—Melvyn I. Marquis
*Attorney, Agent, or Firm*—Kenneth S. Wheelock

[57] ABSTRACT

Novel curable siloxane polymers having integral ultra-violet light absorbers are disclosed which are useful in preparing a variety of commercial silicone products requiring excellent resistance to loss of UV protection due to external forces.

6 Claims, 2 Drawing Sheets

CURABLE SILOXANE POLYMERS CONTAINING INTEGRAL UV ABSORBERS

This is a continuation of Ser. No. 08/411,061 filed on Mar. 27, 1995 which is a continuation of application Ser. No. 08/208,761 filed on Mar. 8, 1994, both abandoned, which is a divisional of 07/974,054 filed Nov. 10, 1992, now issued U. S. Pat. No. 5,310,845.

The present invention relates to novel curable siloxane polymers. More particularly, the present invention relates to ultra-violet absorbent curable siloxane polymers. Most particularly, the present invention relates to curable siloxane polymers having integral silylated ultra-violet light absorbers and to a novel method of making these polymers.

BACKGROUND OF THE PRESENT INVENTION

Protection against ultra-violet (UV) radiation, such as from the sun, has become an important issue in the preparation of personal, household and automotive products in recent years. Depletion of atmospheric ozone has led to an increase in the amount of atmospheric UV radiation, and concurrently has resulted in the need to filter out such harmful rays.

Silicone polishes are commonly used to improve the appearance of, as well as to protect, household products, luggage, marine and automobile vinyl and the like. While silicone polishes are generally considered excellent by those skilled in the art, they suffer from the shortcoming that when they are prepared by conventional mechanical methods, the ultraviolet light absorbing agents contained therein are considered to be fugitive materials, from the standpoint of various external conditions such as weathering, abrasion, heating and the like.

Silicones with fugitive UV agents can also be utilized in emulsion form for use as a treating agent for fabrics, upholstery, carpeting, draperies and the like. Treatment with such silicone emulsions imparts water and dirt repellency to the fabric as well as UV resistance.

It is further known that fugitive UV agents can be added to silicones for use in cosmetic applications such as make up, sun tanning lotions and hair products. Lamb et al., U. S. Pat. No. 5,049,377 teaches the use of UV absorber additives in a hair care composition comprising hydrophobic cationic emulsions of highly branched and/or crosslinked polydimethylsiloxane.

In each of the foregoing applications, while the protection against UV radiation lasts for a finite period of time, due to weathering, abrasion and heating etc. the protection is lost much sooner than desired. Accordingly, attempts have been made in the art to provide a UV absorbent silicone polymer which has improved resistance to weathering.

Forrestier et al., U. S. Pat. No. 5,089,250, teach a benzotriazole-containing diorganopolysiloxane cosmetic, prepared by a hydrosilation process comprising (i) preparing a benzotriazole derivative by reacting an alkenyl halide with a benzotriazole compound, and then (ii) reacting the benzotriazole derivative with a silicone hydride.

Hill et al., U. S. Pat. No. 4,554,369, teach the preparation of organosilicon compounds which are useful as sunscreens and which are prepared by reacting an epoxy containing siloxane with the appropriate acid or acid chloride.

Special mention is made of Thimineur et al., U. S. Pat. No. 4,696,969 which discloses emulsion polymerized silicone emulsions having siloxane bonded UV absorbers. The patentees teach dispersing the siloxane in water with an emulsifier, adding the UV agent during emulsion polymerization of the siloxane to chemically bond the UV agent to the resulting emulsion polymerized polydiorganosiloxane.

It has now been discovered that a novel UV containing curable silanol-terminated siloxane polymer can be produced, and that such compounds have excellent retention of UV resistant properties under conditions of weathering.

SUMMARY OF THE PRESENT INVENTION

According to the present invention there is provided a curable siloxane polymer containing integral UV stabilizers comprising those of the following general formula:

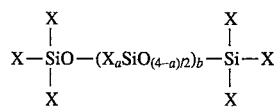

wherein each X is the same or different and represents hydrogen, hydroxyl, hydrocarbon or substituted hydrocarbon or a curable silylated ultraviolet light absorbing agent (hereinafter "curable silylated UV agent") provided at least one of X is a curable silylated UV agent, "a" is 0, 1 or 2, and "b" is above about 1.

Also according to the present invention there is provided a method of preparing a curable siloxane polymer containing integral UV stabilizers comprising those of the following general formula:

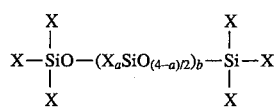

wherein each X is the same or different and independently represents hydrogen, hydroxyl, hydrocarbon or substituted hydrocarbon or a curable silylated UV agent provided at least one of X represents a curable silylated UV agent, "a" is 0, 1 or 2, and "b" is above about 1, the method comprising:
(a) mixing a solvent and a curable siloxane to form a siloxane mixture;
(b) adding to the siloxane mixture a curable silylated UV agent;
(c) diluting the mixture obtained in step (b) with a co-solvent and mixing to form a solution;
(d) adding a catalyst to the solution and reacting.

DETAILED DESCRIPTION OF THE PRESENT INVENTION

Figure 1:
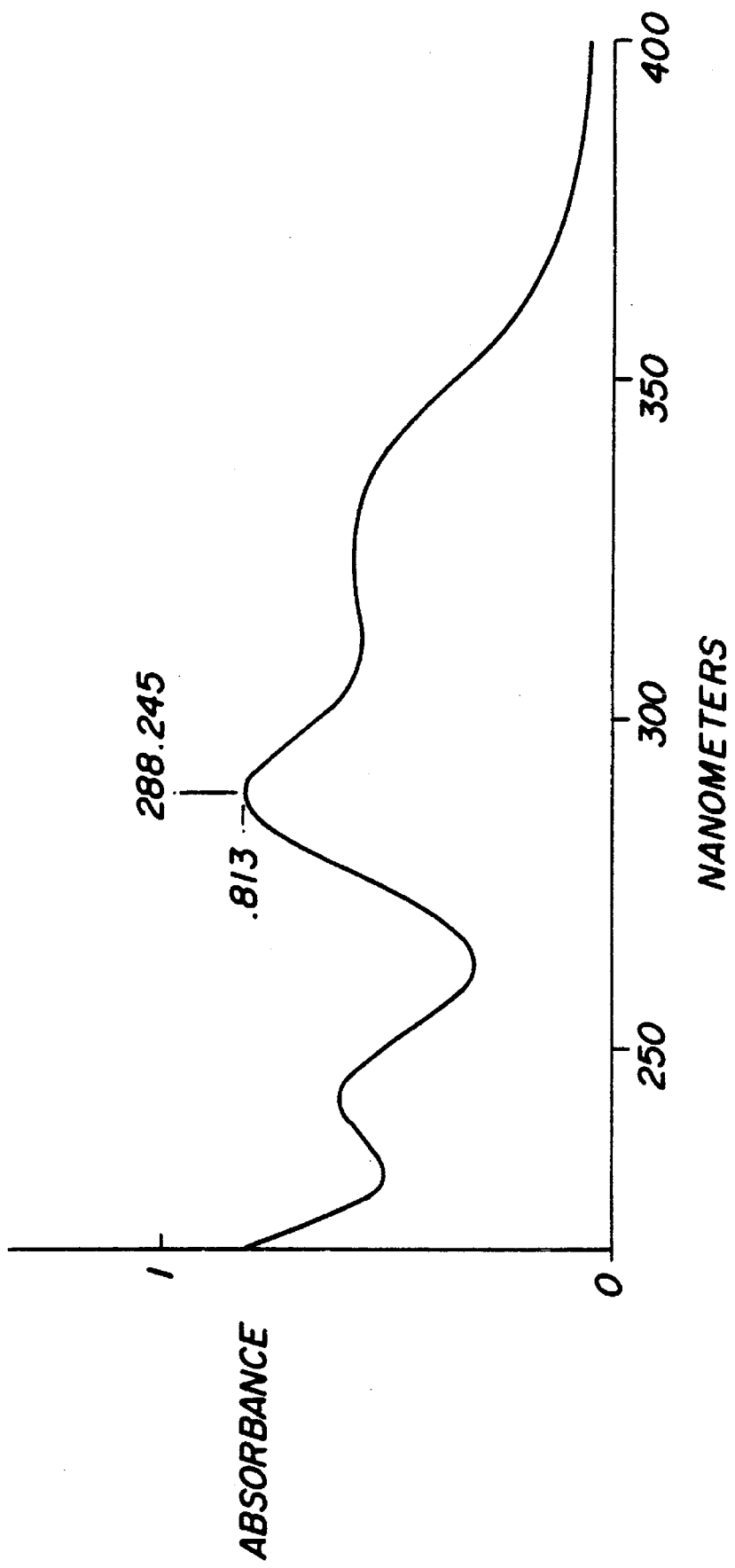
FIG. 1 depicts in graphic form the UV absorption spectra of a curable siloxane polymer having integral UV stabilizers according the claims of the present invention.

The compositions of the present invention are generally prepared by blending the curable silylated UV absorbing agent with a silanol-containing siloxane followed by dilution with co-solvents, and reaction in the presence of a catalyst. The invention will be described with regard to linear silanol-terminated siloxanes, although it is to be understood that the scope of the invention also includes branched silanol-terminated siloxanes and other curable siloxanes.

The linear silanol-terminated, or silanol-chain stopped, siloxanes for use in the practice of the present invention may be represented by the formula:

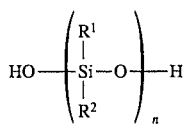

wherein $R^1$ and $R^2$ are the same or different and are each independently organic radicals of up to about 20, and typically up to about 8, carbon atoms, selected from hydrocarbyl, halohydrocarbyl and cyano lower alkyl and n is a number that varies generally from about 1 to about 10,000, preferably from about 20 to about 3,000, and more preferably from about 6 to about 1,000.

The silanol-chain stopped polydiorganosiloxanes are well known in the art and they may be prepared by known methods, such as described in Beers, U. S. Pat. No. 3,382,205 and may include compositions containing different $R^1$ and $R^2$ groups. For example, in the formula above, the $R^1$ groups can be methyl, while the $R^2$ groups can be phenyl and/or beta-cyano-ethyl and/or trifluoropropyl. Furthermore, within the scope of the definition of polydiorganosiloxanes useful in the present invention are copolymers of various types of diorganosiloxane units, such as silanol chain-stopped copolymers of dimethylsiloxane units, diphenylsiloxane units, and methylphenylsiloxane units, or, for example, copolymers of dimenylsiloxane units, methylphenyl-siloxane units and methylvinyl siloxane units. Preferably, at least 50% of the $R^1$ and $R^2$ groups of the silanol chain-stopped polydiorganosiloxanes are alkyl, e.g., methyl groups.

In the above formula, $R^1$ and $R^2$ can be selected from, for example, mononuclear aryl, halogen-substituted mononuclear aryl, alkyl, alkenyl, alkynyl, haloalkyl, haloalkenyl, haloalkynyl, cycloalkyl, cylcoalkenyl, alkyl and halogen substituted cycloalkyl and cycloalkenyl, and cyano lower alkyl.

Further, it is contemplated that a mixture of various silanol-terminated polydiorganosiloxanes may also be employed. The silanol-terminated polydiorganosiloxanes employed in the practice of the present invention may vary from low viscosity thin fluids to viscous gums, depending on the value of n and the nature of the particular organic groups represented by $R^1$ and $R^2$ of the above formula.

The viscosity of the silanol-terminated polydiorganosiloxanes thus varies broadly, e.g., in the range of from about 10 to about 1,000,000 cps at 25° C. Preferably it will be in the range of from about 20 to about 60,000 cps, and especially preferably from about 30 to about 10,000 cps at 25° C.

The ultra violet light or radiation absorbing agents useful in the practice of the present invention are curable silylated UV agents and may be prepared from a wide variety of known UV agents, such as, for example, benzophenones, benzotriazoles and aminobenzoic acids, as well as others which are available commercially and described in the literature. The UV agent is generally silylated by an addition type reaction with a curable silylating agent. Typically, the curable silylating agent is a silane of the formula $R'_rR''_sR^H_t$ $Si$ where $R'$ is alkanoyl, $R''$ is alkyl, $R^H$ is hydrogen, "r" is 1, 2, or 3, "s" is 0, 1 or 2, and "t" is 1, 2 or 3, and r+s+t is 4. Particularly useful as a silylating agent is triethoxy silicon hydride.

A particularly useful class of ultraviolet light absorbing agents for use in the present invention is described in Ashby, et al., U. S. Pat. No. 4,278,804. Of course, as stated above, other suitable ultraviolet light absorbing agents effective for practicing the present invention can be readily determined by the artisan without undue experimentation. Briefly, Ashby et al. discloses ultraviolet light absorbing agents having the formula

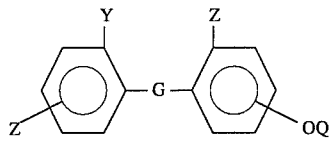

wherein
G is

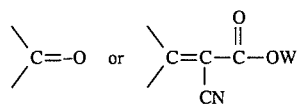

Y is H or OH,

Z is H, OH, OQ or OW, where at least one Z is OH if Y is H,

Q is $-CH_2(CH_2)_mSi(R^3)_x(OR^4)_y$ and

W is $-C_pH_{2p+1}$, where x=0, 1 or 2, y=1, 2 or 3 and x+y=3, $R^3$ is an alkyl or alkanoyl radical having from 1 to about 6 carbon atoms, $R^4$ is an alkyl radical having from 1 to about 6 carbon atoms, m=0, 1 or 2 and p=1 to 18.

Especially useful UV light absorbing agents for practice in the present invention are compounds having the formulas:

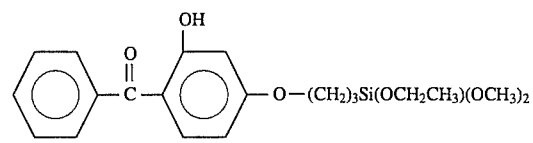

and

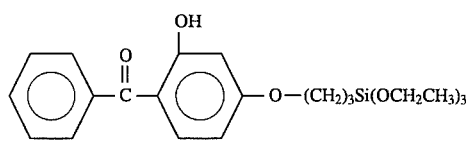

An example of another class of suitable ultraviolet light absorbing agents is silylated para-aminobenzoic acid and its derivatives, for example, its esters having from 1 to 15 or more carbon atoms. Of course, it is also possible to substitute the hydrogen atoms of the amino radical with alkyl radicals such as methyl and ethyl. Such silylated derivatives are generally prepared by an addition type reaction, for example, according to the reaction equation

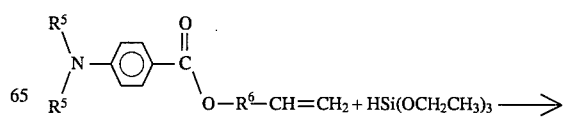

-continued

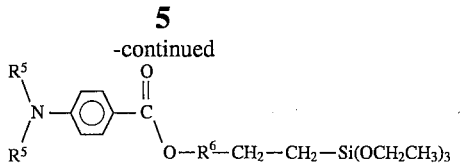

where each $R^5$ is the same or different and independently represents hydrogen or a lower alkyl radical and $R^6$ is a $C_{1-15}$ hydrocarbon radical.

Some other examples of benzophenone and benzotriazole compounds are described in U. S. Pat. Nos. 3,043,709; 3,309,220; 3,049,443 and 2,976,259. These may similarly be silylated according to methods well known to those skilled in the art, such as the above-described addition method.

The amount of siloxane and curable silylated UV agent employed in the present invention can vary widely as long as sufficient curable silylated UV agent is employed to provide improved UV light absorption. Accordingly, the molar ratio of siloxane to curable silylated UV agent may vary from about 1:1 to about 1:5. The ratio of siloxane and curable silylated UV agent, and the structure of the siloxane will affect the location of substitution of the UV agent on the siloxane. For example, a 1:2 molar ratio with a silanol-terminated siloxane will produce a polysiloxane which is terminated with the silylated UV agent, i.e., one of the formula:

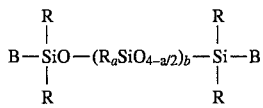

wherein each R is the same or different and independently represents hydrocarbon or substituted hydrocarbon, B represents the same or different silylated ultra violet light absorbing agent, and a is 0, 1 or 2, and b is above about 1, and preferably from about 1 to about 10,000.

To prepare the compositions of the present invention, the siloxane and curable silylated UV agent components are typically diluted in the presence of a solvent and a co-solvent, due to the incompatibility of the siloxane and silylated UV agent. The solvent and co-solvent can be any known to those skilled in the art to form a homogeneous solution of the siloxane and UV stabilizer.

Particularly useful is a system comprising a hydrocarbon solvent and an alcohol co-solvent. Illustratively, the hydrocarbon solvent comprises normally liquid aliphatic, cycloaliphatic or aromatic hydrocarbon or halogenated hydrocarbon compounds of from about 6 to about 15 carbon atoms. These include, but are not limited to, n-heptane, cycloheptane, n-hexane, cyclohexane, benzene, toluene, xylene, styrene, naphthene, methylene chloride and mixtures thereof. The hydrocarbon solvent may also comprise poly-alpha-olefins and mineral oils such as mineral spirits.

As the co-solvent any of the lower alcohols may be employed, such as, but not limited to, methanol, ethanol, propanol, isopropanol, butanol and the like. A particularly useful system comprises mineral spirits as the solvent and isopropanol as the co-solvent. Alternatively, the co-solvent may comprise a glycol, such as but not limited to, propylene glycol, ethylene glycol, and the like.

The amount of solvent and co-solvent employed is not critical, so long as a homogeneous solution of the siloxane and UV light absorbing agent is obtained. Generally, from about 5 to about 50 parts by weight of solvent is employed; and from about 5 to about 50 parts by weight of co-solvent is employed, based on 100 total parts by weight of the solvent, co-solvent, siloxane and UV agent combined.

A catalyst is then added to the solution containing the siloxane and benzophenone. The catalysts which are useful in the practice of the present invention are those containing an amine group. Conveniently these may be selected from aminofunctional silanes, quaternary ammonium salts, organofunctional amines or aminofunctional siloxanes.

The aminofunctional silanes are known to those skilled in the art. These are generally of the formula:

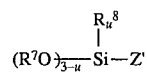

where $R^7$ and $R^8$ are $C_{1-8}$ monovalent hydrocarbon radicals, "u" varies from 0 to 3 and Z' is an amine group or a saturated, unsaturated or aromatic hydrocarbon functionalized by an amino group.

Preferred compounds within the formula above are for instance, 3-(2-aminoethylamino)propyltrimethoxy silane, gamma-aminopropyltriethoxysilane and gamma-aminopropyltrimethoxysilane. Other aminofunctional silane catalysts that can be utilized in the instant invention are as follows: gamma-aminopropylmethyldiethoxysilane; gamma-aminopropylmethyldimethoxysilane; bis(3-(triethoxysilyl)propyl)amine; bis(3-(triethoxysilyl)propyl)ethylenediamine; 3-(2-aminoethylamino)-propyldimethoxy-t-butoxysilane; methacryloxyethylaminopropyltrimethoxysilane; methylaminopropyltrimethoxysilane; methylaminopropyltriethoxysilane; (N,N-dimethyl-3-amino)propyltrimethoxysilane; N,N-dimethylaminophenyltriethoxysilane; and N,N-dimethylaminoethyldimethoxysilane.

The quaternary ammonium salts useful in the practice of the present invention as catalysts are also well known to those of ordinary skill in the art, who will recognize that certain of these compounds are also useful as surfactants. Illustratively, these include, but are not limited to methylpolyoxyethylene (15) cocoammonium chloride and dimethylsoyammonium chloride, commercially available as Ethoquad®C/25 and Arquad® 2S-75 from Armak Company, respectively.

Likewise, the organofunctional amines are also well known to those skilled in the art. Typically they are saturated, unsaturated or aromatic hydrocarbons which are functionalized by an amino group. Generally, they can include those of the formulae $R^9NH_2$, $R^9_2NH$ or $R^9_3N$ where each $R^9$ is independently the same or different alkyl, alkenyl or aryl group. Exemplary of useful amines include, but are not limited to, methylamine, diethylamine, tri-n-propylamine, cyclohexylamine, benzylamine, ethylenediamine, phenylethylamine, aniline, toluidine and the like.

The amount of catalyst employed in the present invention typically varies from about 0.05 to about 1 weight percent, preferably from about 0.1 to about 0.5 weight percent, and more preferably from about 0.1 to about 0.25 weight percent, based on the total weight of the siloxane, UV agent, solvent and co-solvent combined.

The mixture of the silanol terminated siloxane, UV agent, solvent, co-solvent and catalyst are then agitated, and the solvents readily evaporated to form the UV-containing curable polysiloxanes of the present invention. It is also contemplated that the mixture may be heated during reaction, although heating is not necessary.

The siloxanes of the present invention are curable, and can be employed in a wide variety of personal care, household and automotive products, as is known to those skilled in the art.

DESCRIPTION OF THE PREFERRED EMBODIMENTS

The following examples illustrate the present invention. They are not to be construed to limit the scope of the claims of the present invention in any manner whatsoever.

EXAMPLES 1–3

Three benzophenone-containing silanol-terminated polydimethylsiloxanes are prepared according to the following procedure. Mineral spirits solvent and linear polydimethylsiloxane fluid are charged to a vessel and agitated for 30 minutes. To the vessel is then charged 2,4-dihydroxybenzophenone derivative (silicone triethoxy substituted), and the mixture is agitated for 2 additional hours until uniform. When the mixing is complete, isopropyl alcohol is added to the mixture, and mixing continues for 30 minutes until a homogeneous clear solution is obtained.

To the solution is then added 1 percent by weight of aminopropyltriethoxy silane catalyst, with agitation for one hour. There is obtained a UV containing curable siloxane according to the present claims. The compositional data of the three examples prior to catalyst addition is set forth below in Table 1.

TABLE 1

| Example | 1 | 2 | 3 |
|---|---|---|---|
| PDMS[a] | 49.0 | — | — |
| PDMS[b] | — | 48.2 | — |
| PDMS[c] | — | — | 17.4 |
| SHBP[d] | 1.0 | 1.8 | 32.6 |
| MS[e] | 37.5 | 37.5 | 37.5 |
| IPA[f] | 12.5 | 12.5 | 12.5 |

[a] = Linear silanol terminated polydimethylsiloxane fluid having average molecular weight of 40,000 and viscosity of 3,000 cps at 25° C.
[b] = Linear silanol terminated polydimethylsiloxane fluid having average molecular weight of 22,000 and viscosity of 1,000 cps at 25° C.
[c] = Linear silanol terminated polydimethylsiloxane fluid having average molecular weight of 450 and viscosity of 40 cps at 25° C.
[d] = 2,4-dihydroxybenzophenone derivative
[e] = Mineral spirits
[f] = Isopropyl alcohol

EXAMPLE 4

The UV absorption of the siloxane polymer of Example 3 is determined by placing a 0.5 mm cell of 144 mg of polymer per liter of isopropyl alcohol and testing in a Cary UV Spectrometer, Model 2400. For comparative purposes, a 0.5 mm cell of 50 mg of 2,4-dihydroxybenzophenone per liter of isopropyl alcohol is also tested.

Figure 2:
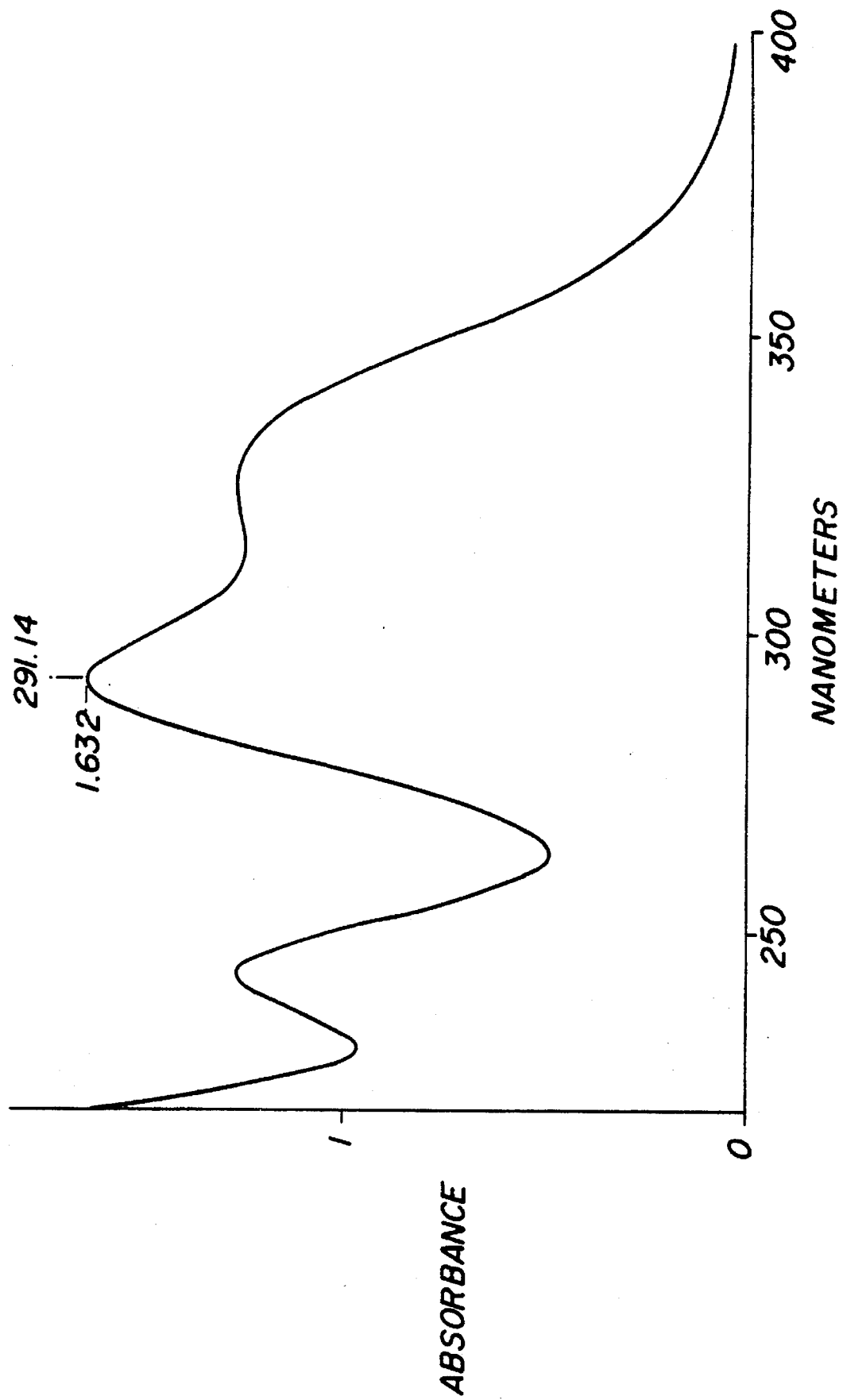
FIG. 2 depicts in graphic form the UV absorption spectra of a fugitive UV light additive.

The results are set forth in FIGS. 1 and 2, respectively.

From the results it can be seen that the siloxane polymers of the present invention exhibit substantially the same UV band absorption characteristics as the fugitive UV additive. The intensity differences are due to the molecular weight differences of the active UV species.

The above-mentioned patents are all hereby incorporated by reference.

Many variations of the present invention will suggest themselves to those of ordinary skill in the art in light of the above-detailed description. For example, other silylated benzophenones or silylated para-amino benzoic acids may be employed as the UV agent. Further, any of the aminofunctional catalysts such as 3-(2-aminoethylamino)propyltrimethoxy silane, gamma-aminopropyltrimethoxy silane, methylpolyoxyethylene (15) cocoammonium chloride, dimethylsoyammonium chloride, amino functional polydimethylsiloxanes and tri-n-propylamine may be used. All such obvious modifications are within the full intended scope of the appended claims.

We claim:

1. A curable siloxane polymer containing integral UV stabilizers comprising those of the following general formula:

$$X-\underset{\underset{X}{|}}{\overset{\overset{X}{|}}{Si}}O-(X_aSiO_{(4-a)/2})_b-\underset{\underset{X}{|}}{\overset{\overset{X}{|}}{Si}}-X$$

wherein each X is the same or different and represents hydrogen, hydroxyl, hydrocarbon or substituted hydrocarbon or a curable silylated ultraviolet absorbing group provided at least one of X is a curable silylated ultraviolet absorbing agent, a is 0, 1 or 2, and b is above about 1.

2. A curable siloxane polymer as defined in claim 1 wherein said polymer is of the general formula $$B-\underset{\underset{R}{|}}{\overset{\overset{R}{|}}{Si}}-O-(R_aSiO_{4-a/2})_b-\underset{\underset{R}{|}}{\overset{\overset{R}{|}}{Si}}-B$$

wherein each R is the same or different and independently represents hydrocarbon or substituted hydrocarbon, each B represents the same or different silylated ultra violet light absorbing group, a is 0, 1, or 2, and b is above about 1 wherein B is a substituent produced by reacting a silylated benzophenone of the general formula

[chemical structure showing two phenyl rings connected by G, with substituents Y, Z, Z, and OQ]

wherein

G is $$\overset{\diagdown}{\diagup}C=O \quad \text{or} \quad \overset{\diagdown}{\diagup}C=\underset{\underset{CN}{|}}{C}-\overset{\overset{O}{\|}}{C}-OW$$

Y is H or OH,

Z is H, OH, OQ, or OW, where at least one Z is OH if Y is H,

Q is $-CH_2(CH_2)_mSi(R^3)_x(OR^4)_y$ and

W is $-C_pH_{2p+1}$, where x=0, 1 or 2, y=1, 2 or 3 and x+y=3, $R^3$ is an alkyl or alkanoyl radical having from 1 to about 6 carbon atoms, $R^4$ is an alkyl radical having from 1 to about 6 carbon atoms, and m=0, 1 or 2 and p=1 to 18, with a curable siloxane.

3. A curable siloxane polymer as defined in claim 2 wherein each R independently comprises an aliphatic hydrocarbon, vinyl, allyl, phenyl, cyanoethyl or trifluoropropyl.

4. A curable siloxane polymer as defined in claim 2 wherein each R is methyl.

5. A curable siloxane polymer as defined in claim 1 wherein a is 2.

6. A curable siloxane polymer as defined in claim 2 wherein B represents a substituent produced by reaction of a compound of the formula:
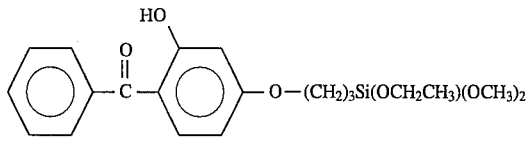
or
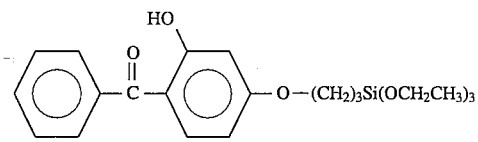
or mixtures thereof.
* * * * *